June 23, 1953  F. G. DANHIER  2,642,965
WELDMENT AND PROCESS FOR MAKING HIGH TENSILE
STEEL WELDMENTS BY ELECTRIC ARC WELDING
Filed Sept. 23, 1949  2 Sheets-Sheet 1
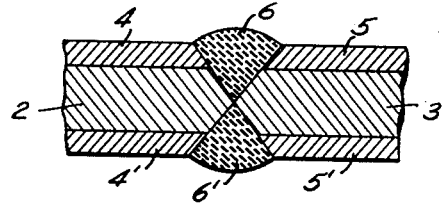
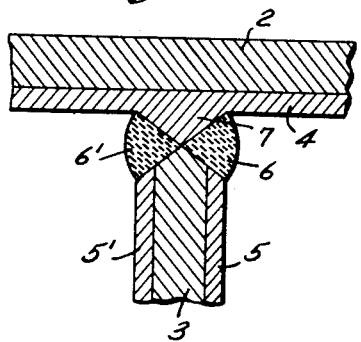
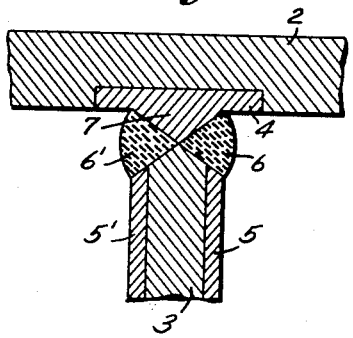
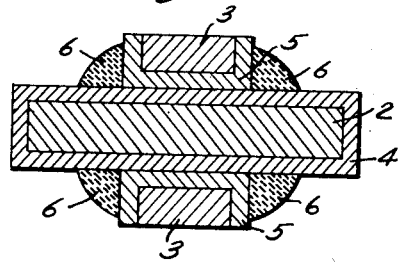
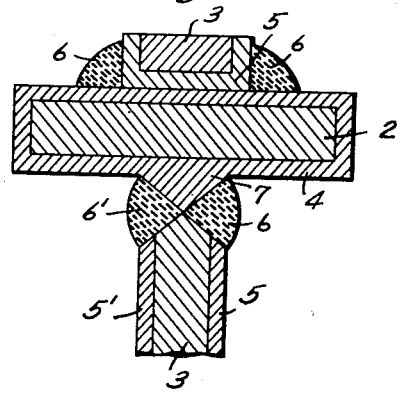
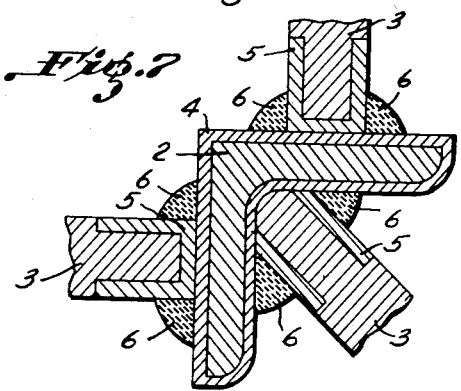
Inventor
FRANÇOIS GEORGES DANHIER
By
Attorneys June 23, 1953 F. G. DANHIER 2,642,965
WELDMENT AND PROCESS FOR MAKING HIGH TENSILE
STEEL WELDMENTS BY ELECTRIC ARC WELDING
Filed Sept. 23, 1949 2 Sheets-Sheet 2

Inventor
FRANÇOIS GEORGES DANHIER

By
Attorneys

Patented June 23, 1953

2,642,965

UNITED STATES PATENT OFFICE 2,642,965

WELDMENT AND PROCESS FOR MAKING HIGH TENSILE STEEL WELDMENTS BY ELECTRIC ARC WELDING

François Georges Danhier, Anderlecht, Belgium, assignor to La Soudure Electrique Autogène Societe Anonyme, Brussels, Belgium Application September 23, 1949, Serial No. 117,438

3 Claims. (Cl. 189—36)

The present invention relates to a process for the construction of high tensile steel weldments, particularly of low alloy steel having in the annealed state a minimum ultimate tensile strength equal to 74,000 pounds per square inch, in which pieces of a minimum thickness of ⅜" are assembled by electric arc welding, by means of superimposed passes of weld metal.

It is known that rolled steels become less weldable as their thickness increases and as, therefore, their percentage reduction diminishes and the coarseness of their grain increases.

It is also known that relatively thin (less than ⅜ of an inch thick) low alloy, high tensile steels are not readily weldable, while not one of them possesses an acceptable weldability beyond 1 inch thickness.

"High-tensile steels" in the meaning of the present invention are steels of ultimate tensile strength equal to at least 74,000 pounds per square inch when they are in the annealed condition.

The deficiency in weldability of high-tensile steels, which increases with their content of carbon, manganese and other metallic alloys, leads to such a lack of safety in the welded structure that it may be undesirable to employ them for the construction of heavy welded structures, such as, for example, large bridges or large ships.

The lack of weldability in heavy gauge of high-tensile steels is due to the combined effects of three principal causes:

(1) In a welded construction the residual welding stresses frequently combine unfavourably with the stresses due to external loads. As a result, there exist at numerous points of the work triaxial stresses, and very high stress concentrations which, as a rule, cannot be taken into account in the computation of strength because their precise value is not known. These triaxial stresses are capable of producing ruptures without any prior plastic deformation of the metal. The risk is all the greater as the metal is harder where these triaxial stresses occur. This is the case with high-tensile steels, and more particularly with the quenched metal adjacent to the welds.

It should be mentioned that dangerous triaxial stresses, in a welded construction, are localized in the neighbourhood of the surfaces of the members assembled by welding. In fact, on the one hand, the bending and torsion stresses are greatest near the surfaces, and on the other hand, in the welded joints produced by several passes, the residual welding stresses are particularly due to the last pass of each joint and reach their maximum in the proximity of the latter (because the stresses due to the preceding passes are largely reduced by heating during the following passes). As a result, the combinations of the residual stresses and the working stresses which are most detrimental, are located in the neighbourhood of the surfaces of the metallic elements assembled by welding.

(2) The metal of the welded members situated near the welding seams, undergoes heat treatment by virtue of the passage of the electric arc. Near a welding seam made by the electric arc process one may observe in the base material the existence of a quenched zone and, around this zone, the existence of a zone softened by tempering.

If the steel of the welded members is an extra mild steel of low carbon content, the metal of the quenched zone is barely harder, and that of the tempered zone hardly softer than the metal before welding. If on the other hand, the metal contains a substantial proportion of carbon, manganese, chromium, nickel, molybdenum or other alloying elements for increasing the strength of the steel, the quenched zone is unavoidably hard and brittle.

It should also be mentioned that in joints welded in several passes, the hardened zone of one pass becomes the softened zone of the following pass. This tempering effect reduces the hardness and brittleness of this zone which was originally hardened. Only the quenched zone of the last pass of the joint is not softened.

Consequently, in a weldment of high tensile steel, the most brittle heat-affected zones are situated in the neighbourhood of the welds, near the surfaces of the assembled elements.

(3) Welded constructions always contain numerous notches, caused either by the constructional arrangements (T joint, lap joint), or by weld defects (slag inclusion and undercut).

It is known that the existence of notches in a stressed piece reduces its strength. This diminution is slight in the case of very mild steels, but very considerable in the case of harder steels, such as high tensile steels.

It should be mentioned that in a welded construction, the largest number of these notches are situated on the surface of the elements assembled by welding (undercut from the last pass of each joint, constructional gaps of the T or lap joints).

The object of the present invention is to provide a process for welding construction of structures of high tensile steel of the abovementioned type, by virtue of which the abovementioned disadvantages are largely reduced.

According to the invention, pieces of low alloy high tensile steel, cladded, on that surface at which the multipass welds are to be terminated, with a veneer or layer of mild steel presenting in the annealed condition a maximum ultimate tensile strength of 64,000 p. s. i., are assembled by welding.

The composite pieces, made up of a core of low-alloy steel and a veneer or layer of mild steel, may be produced by any suitable known processes.

In weldments constructed with these composite elements, the abovementioned welds are made in several passes, the last passes, which are the most critical in the behaviour of the work, being made in the cladding of mild steel. Weldable extra mild steel is a better heat conductor than alloy steels. When a weld is made on the cladding of a composite element, the heat effect in depth is therefore less than in the case of plain high tensile steel and the hardened zone does not penetrate, or only slightly penetrates, into the high tensile metal. This metal, occasionally hardened in this manner, can always be softened by welding a supplementary, final pass, while the quenched zone in the cladding is free from brittleness.

On the other hand, the most objectionable combinations of stresses, localized near the surface of the members, are thus situated in the least fragile and most weldable metal.

Finally, most of the notches to be expected are located in the mild steel cladding where their undesirable effect is negligible.

In order to be able to weld the last passes of the joints in the cladding, with electrodes of heavy gauge suitable for the thicknesses of the members (for instance, electrodes of 8, 10 and 12 gauge) without penetration of the hardened zone which remains in the neighbourhood of the last passes of the joint unduly into the high-tensile core, the clad layer should have a minimum thickness of 1/8" plus three-hundredths of the total thickness of the composite member to be welded.

Other requirements and details of the process according to the invention will appear in the course of the description of the accompanying drawings, which illustrate, by way of example only, several types of joints welded by the process in accordance with the invention, as well as a test of weldability of a composite piece treated in accordance with the invention.

Figures 1 to 7 are cross-sectional views showing welded joints effected by the process according to the invention.

Figure 8:
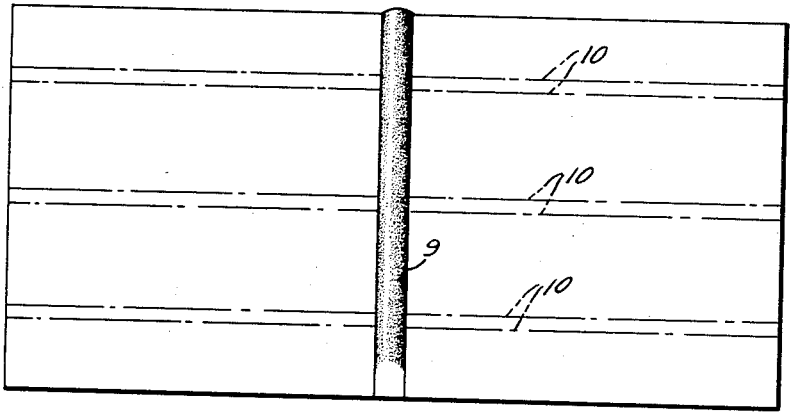
Figure 8 is a plan view of a plate used for the preparation of a bar for a weldability test, generally known as "bead-weld-nick-bend-test."
Figure 9:
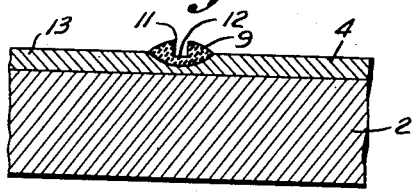

Figure 9, drawn to a large scale, is a longitudinal section across the midde part of a test bar obtained from the plate according to Figure 8 after having cut a kerf with a saw in the weld seam.

Figure 10:
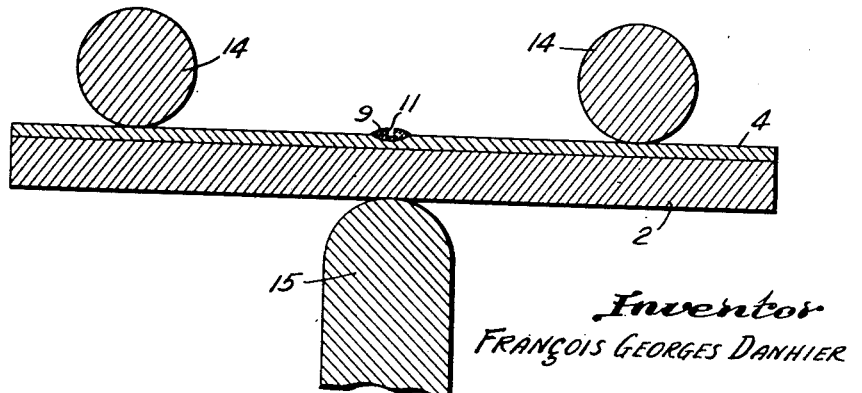

Figure 10 is a sketch of the installation used for carrying out the above weldability test.

In these different figures the same reference characters denote identical elements.

Figure 1 shows the parts adjoining a weld between two pieces 2 and 3 of low alloy steel, having, in an annealed condition, an ultimate tensile strength of at least 74,000 p. s. i., cladded on one surface with veneers or layers of mild steel indicated respectively as 4 and 5. The ultimate tensile strength of this mild steel is, in an annealed condition, 64,000 p. s. i. maximum.

Each composite element 2—4 or 3—5 has a total thickness of over 3/8". The two elements are butt welded by means of a V-shaped welding joint 6 which is made by successive passes by means of welding electrodes of the usual type employed for steel welding. The V, formed between the pieces, has its opening on the side of the veneers or cladding layers 4 and 5 of mild steel. In other words, the veneers are located on that surface of the pieces on which the last pass of the weld is to be deposited.

The thickness of the claddings 4 and 5 is at least 1/8" plus three-hundredths of the total thickness of the composite piece 2—4 or 3—5, so as to permit the use of electrodes of normal gauge for welding pieces of the total thickness concerned, without the hardened and untempered zone being allowed to penetrate noticeably into the low alloy high tensile metal constituting the parts 2 and 3.

Figure 2 shows two composite pieces each comprising a core of low alloy high tensile steel, indicated by 2 and 3, covered on both sides with a cladding of mild steel. These layers are indicated by 4 and 4' in the case of the core 2, and by 5 and 5' in the case of the core 3. The butt weld of these two pieces has been executed in successive passes by an X-grooved welding joint 6—6'.

In Figure 3 the composite piece 2—4 has a rib 7 at the assembling point. This rib 7 is formed on the cladding 4.

The claddings may cover the whole surface of the piece of which they are a part. In the special case of large members, there may be reasons of economy for limiting the claddings to the vicinity of the welds. Figure 4 shows a composite piece 2—4—7 in which the cladding is provided only in the vicinity of the welding joint 6—6'.

Figure 5 shows a composite piece 2—4 of rectangular cross section, the veneer or cladding layer of which extends over the four surfaces, and two composite pieces 3—5, also of rectangular cross section, the veneer of which extends over three of the four surfaces. The welding joints 6 applied in the angles, are in contact with the mild steel claddings of the assembled pieces.

Figure 6 shows another weldment effected in accordance with the invention, in which a rib 7 of the composite piece 2—4—7 is formed by a cladding 4 which extends over the whole surface of core 2.

Figure 7 shows a weldment according to the invention, in which an L-shaped core 2 is covered completely by a cladding 4 and is assembled with three other composite pieces 3—5. Each of these latter pieces has a cladding 5 only in the vicinity of the weld 6.

The considerations presented in the beginning of this description suffice to make it clear that the existence of the mild steel veneer almost wholly eliminates the causes of the poor behavior of the low alloy high tensile steels in heavy welded structures.

In addition, weldability tests have been carried out to verify directly the properties of the composite elements employed in the process according to the invention.

These composite elements have been submitted to the bending test with notched transverse weld, proposed by Jackson and Luther, which is generally known as the "bead-weld-nick-bend-test."

The procedure is as follows: On a composite plate 8 (Figure 8) measuring 300 millimeters by 150 millimeters, comprising, on the one hand, a part 2 (Figure 9) of low alloy high tensile steel of 21 millimeters' thickness and, on the other hand, on one surface of this part 2, a veneer 4 of extra mild steel of 4 millimeters, a bead weld 9 was laid by means of a $\frac{3}{32}''$ electrode depositing a metal of an ultimate tensile strength of 64,000 p. s. i. From the centre of this plate, two bending bars of 40 millimeters width were cut out by sawing between the lines 10 in a direction perpendicular to the weld 9. Then a cut 11 (Figure 9) with the saw was made in the welding seam, the kerf being 2.5 millimeters wide and of such depth that the bottom 12 was 1.2 millimeters below the outer surface 13 of the cladding 4. Then the bars were positioned between the supports 14 and 15 (Figure 10) of the bending machine, the round support 15 of 50 millimeters' thickness being at mid-distance between the cylindrical supports 14 which, at their nearest points, were 150 millimeters apart from each other.

The steel of the core 2 contained 0.18% carbon, 0.16% silicon, 1.1% manganese, 0.5% nickel, 0.25% molybdenum, 0.28% copper, 0.1% vanadium and 0.1% chromium. The ultimate tensile strength was, in an annealed state, 93,000 p. s. i. The extra mild steel constituting the cladding 4, contained 0.08% carbon, 0.02% sulphur, 0.03% phosphorus, 0.3% manganese. Its ultimate tensile strength was 60,000 p. s. i.

Both bars were successively submitted to bending in the press. A bending angle of 30° was reached at the time the first crack appeared; the fracture surface was of the mixed type (partly shear type, partly cleavage type).

Two further tests of this kind were performed, using the same materials and operating under the same conditions. Bending angles of 29° and 31° respectively were observed, with a progressive mixed type fracture. In the three test-series the fracture presented 25 to 40% fine grained surface (25 to 40% shear).

These results show that the process according to the invention provides good weldability because it is generally admitted that a steel of a thickness above 20 millimeters is weldable if the bending angle is greater than 25° at the moment when the first crack appears in the "bead-weld-nick-bend-test."

By way of comparison, tests of this kind were also made on bending bars of 22 millimeters' thickness of the same composition as the core 2 of the abovementioned composite bars. A sudden, even explosive, rupture was obtained for bending angles lying between 10 and 15°. The surface of the fractures was coarse grained (cleavage type). This comparison showed the improved weldability obtained by the welding process according to the invention.

Similar results to those just described can be obtained with high tensile low alloy steels and mild steels of compositions different from those described above, provided that the ultimate tensile strength of these steels in an annealed condition is greater than 74,000 p. s. i. and less than 64,000 p. s. i. respectively.

The process according to the invention can be profitably operated with high tensile low alloy steels containing a proportion of carbon of 0.09 to 0.3% and at least one of the metals of the following group: Manganese, chromium, molybdenum, silicon, nickel, vanadium, tungsten, copper, in a proportion making the sum of alloy contents of this group at least 1%. These steels can then be covered with a cladding of mild steel which contains from 0.03 to 0.13% of carbon and, at a maximum, 0.6% of manganese and 0.2% of silicon.

What I claim is:

1. The method of making a weldment of thick parts, using hot rolled low alloy, high tensile steel, which comprises first cladding (1) backings of low alloy high tensile steel containing at least one alloying ingredient of the class consisting of manganese, chromium, molybdenum, silicon, nickel, vanadium, tungsten and copper, containing at least 1% of alloy content selected from the class, having in the annealed condition an ultimate tensile strength of not less than 74,000 p. s. i., hardenable by quenching, and present in a thickness of at least $\frac{3}{8}''$ with (2) a layer of low carbon plain carbon steel of at least $\frac{1}{8}''$ thickness upon one rolled face of the parts to be welded, in continuous intercrystalline bond over the area adjoining the weld, and subsequently arc welding the parts under restraint by a multiplicity of passes of which the last pass is deposited in juxtaposition to the low carbon plain carbon steel layer only.

2. The process of welding thick parts of hot rolled low alloy high tensile steel, which comprises first cladding (1) backings of low alloy high tensile steel containing at least one alloying ingredient of the class consisting of manganese, chromium, molybdenum, silicon, nickel, vanadium, tungsten and copper, containing at least 1% of alloy content selected from the class, having in the annealed condition an ultimate tensile strength of not less than 74,000 p. s. i., hardenable by quenching, and present in a thickness of at least $\frac{3}{8}''$ with (2) one layer of low carbon plain carbon steel at least $\frac{1}{8}''$ thick upon each of two opposite rolled faces of the said backings, in continuous intercrystalline bond over the area adjoining the weld, and subsequently arc welding said parts under restraint by a multiplicity of passes of which the last pass on each face is deposited in juxtaposition to the low carbon plain carbon steel layer only.

3. A weldment of low alloy high tensile steel having composite steel pieces each of which has a backing of at least $\frac{3}{8}''$ thick of low alloy high tensile steel containing at least one alloying ingredient of the class consisting of manganese, chromium, molybdenum, silicon, nickel, vanadium, tungsten and copper, containing at least 1% of alloy content selected from the class, having in the annealed condition an ultimate tensile strength of not less than 74,000 p. s. i., hardenable by quenching, and each of which has at the same side a cladding layer of low carbon plain carbon steel of a minimum thickness of $\frac{1}{8}''$, having at the area adjoining the weld a continuous intercrystalline bond to the backing, and a plurality of electric arc weld beads joining the pieces together and comprising weld-annealed beads joining the low alloy high tensile steel and an outer as-welded bead joining the low carbon plain carbon steel layer only.

FRANÇOIS GEORGES DANHIER.

(References on following page)

References Cited in the file of this patent

UNITED STATES PATENTS

| Number | Name | Date |
|---|---|---|
| 1,005,142 | Becker | Oct. 10, 1911 |
| 1,630,631 | Pauly | May 31, 1927 |
| 1,810,005 | Burnish | June 16, 1931 |
| 1,869,208 | McMillen | July 26, 1932 |
| 2,054,939 | Larson | Sept. 22, 1936 |
| 2,122,994 | Southgate | July 5, 1938 |
| 2,158,799 | Larson | May 16, 1939 |
| 2,163,209 | Pungel | June 20, 1939 |
| 2,170,019 | Gaylord | Aug. 22, 1939 |
| 2,177,868 | Chapman | Oct. 31, 1939 |
| 2,249,629 | Hopkins | July 15, 1941 |
| 2,249,723 | Orr | July 15, 1941 |
| 2,294,650 | Bechtle | Sept. 1, 1942 |
| 2,340,796 | Chyle | Feb. 1, 1944 |

OTHER REFERENCES

"The Welding Journal," September 1938, page 38.